No. 775,439. PATENTED NOV. 22, 1904.
E. J. BERG.
ALTERNATING CURRENT MOTOR.
APPLICATION FILED APR. 9, 1904.
NO MODEL. 2 SHEETS—SHEET 1.

Witnesses.
Harry H. Tilden.
Helen Orford.

Inventor
Ernst J. Berg.
by Albert G. Davis
Att'y

No. 775,439.

Patented November 22, 1904.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 775,439, dated November 22, 1904.

Application filed April 9, 1904. Serial No. 202,298. (No model.)

*To all whom it may concern:*

Be it known that I, ERNST J. BERG, a citizen of the United States, residing at Schenectady, county of Schenectady, State of New York, have invented certain new and useful Improvements in Alternating-Current Motors, of which the following is a specification.

My invention relates to alternating-current motors, and has particular reference to alternating-current motors of the commutator type.

The object of my invention is to provide an efficient form of motor in which only one-half the usual number of sets of brushes may be used and which will possess certain additional advantageous characteristics which will be set out in the following specification. The reduction of the number of brushes is important, not only as regards brush-friction and commutation losses, but also as it permits the several sets of brushes to be spaced far apart even in a motor with a large number of poles and with parallel winding, which with the usual construction would necessitate two sets of brushes per pair of poles.

My invention will best be understood from the accompanying drawings, in which—

Figure 1:
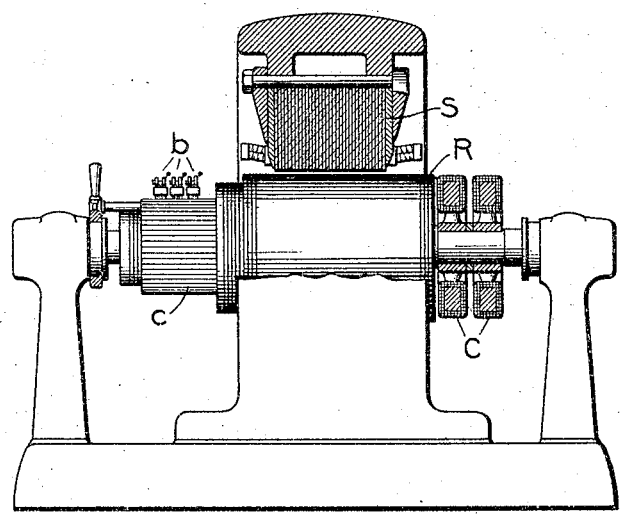
Figure 2:
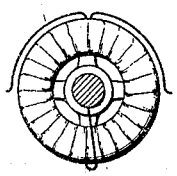
Figure 3:
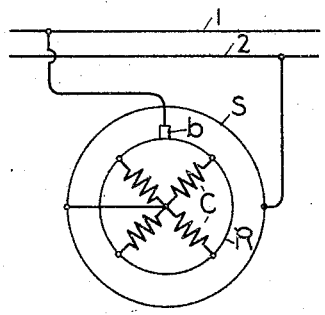
Figure 4:
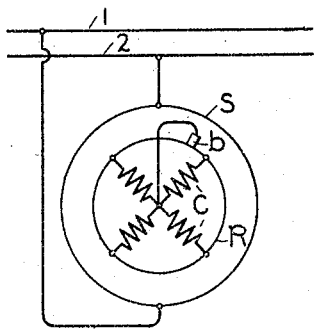
Figure 5:
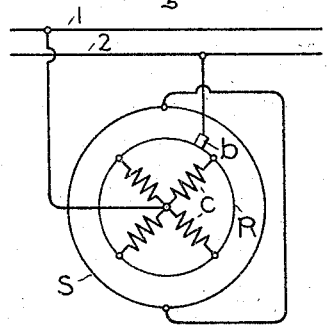
Figure 6:
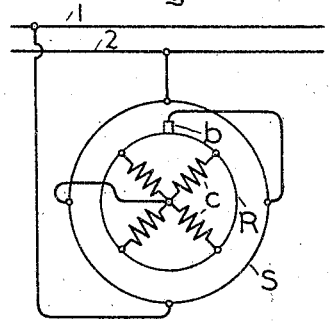
Figure 7:
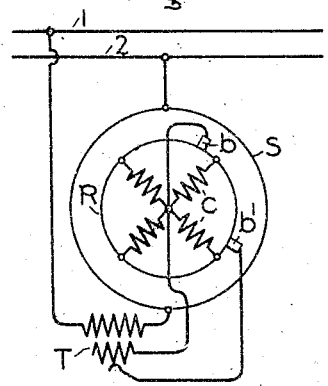
Figure 8:
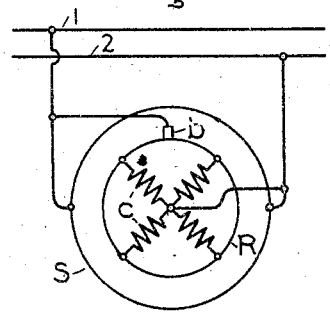
Figure 9:
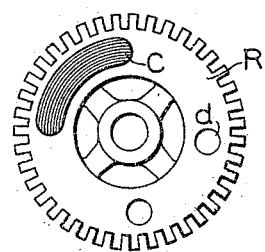

Figure 1 shows a side elevation, partly in cross-section, of an alternating-current motor arranged in accordance with my invention. Fig. 2 shows an end view of a compensator or choke-coil adapted to my invention. Fig. 3 shows diagrammatically my invention applied to an alternating-current series motor. Fig. 4 is a diagram showing the application of my invention to a repulsion-motor. Fig. 5 shows the same applied to what may be called an "inverted" repulsion-motor. Fig. 6 shows the same applied to what may be termed a "series-induced" motor. Fig. 7 shows the same applied to what may be termed a "compensated" repulsion-motor. Fig. 8 shows the same applied to a shunt-motor, and Fig. 9 shows a modified arrangement of the compensators.

In Fig. 1, S represents the stator, and R the rotor, of an alternating-current motor of the commutator type. The rotor is provided with a commutator $c$, on which bears a single set of brushes $b$. Mounted on the rotor-shaft and revolving therewith are shown two compensators or differential choke-coils C. The construction of the choke-coil is clearly shown in Fig. 2. It is formed of a single winding, the two terminals of which are connected to points on the rotor-winding separated by one hundred and eighty electrical degrees. A tap is also brought out from the central or neutral point of the winding, as shown, and grounded on the shaft. This arrangement is shown diagrammatically in Fig. 3 applied to a series motor. One terminal of the stator S is connected to the line-wire 2, while the other terminal is grounded, or, in other words, connected to the neutral point of the two compensators C, which point serves as one terminal of the rotor-winding. The terminals of the compensators are shown connected to the rotor-winding R at points separated by one hundred and eighty electrical degrees. The two compensators are displaced from each other by ninety electrical degrees. The brush $b$ is connected to the other line-wire, 1. Stator S produces a polarization along the line of its terminals. The current passes from the stator to the central points of the compensators C, dividing between the two compensators according to their positions relative to the brush $b$, then passing through the rotor-winding, and out at the brush $b$. The differential action of the compensators C produces an equal division of current in the two parts of each compensator, and when an equal amount of current is flowing in the two parts the induction of the two parts is balanced and produces no impedance in the motor-circuit. Moreover, at starting when the frequency of the rotor-currents is the same as a line frequency each compensator offers a high impedance to the flow of current in the same direction through both parts, so that the effect of the compensators as short circuits may be neglected. The motor consequently starts exactly like an ordinary series motor with two sets of brushes and possesses the high starting torque of the series motor. As the motor approaches synchronism, however, the frequency of the rotor-currents diminishes, and the impedance offered by each compensator to current-flow of the same direction in both its parts diminishes, so that the compensators begin to assume the character of short circuits. Consequently, near synchronism the motor possesses certain of the characteristics of the induction-motor superimposed on those of the series motor. Therefore the motor will not increase its speed indefinitely with decrease of load, as does the series motor, and is for this reason well suited for such purposes as hoists, &c., where a high starting torque is required, but where it is desirable that no indefinite increase of speed shall occur with decrease of load.

I have shown two compensators. The motor would operate with a single compensator; but as the rotor revolved the position of the points of connection of the compensator to the rotor-winding would vary relative to the brush, and consequently the distribution of rotor-current would fluctuate over wide limits, producing a constant variation of the motor flux and torque and seriously reducing the efficiency. With two compensators the fluctuation is reduced to within proper limits, and efficient operation is secured. More than two compensators could be employed, if desired, still further reducing the variation in current distribution. The expense would be increased, however, and sufficiently satisfactory operation may be obtained with only two compensators.

In Fig. 4 I have shown my invention applied to the ordinary repulsion type of motor, the stator connected across the mains 1 2 and a single brush $b$ displaced by the usual angle from the line of the stator-field connected to the neutral point of the compensators. The operation will be evident from the description that has already been given.

Fig. 5 shows my invention applied to what may be called an "inverted" repulsion-motor. The brush $b$ is connected to one of the line-wires, 2, while the other line-wire is grounded on the machine or connected to the neutral point of the compensators C. The stator is short-circuited, as shown on a line displaced from the rotor-brush $b$.

Fig. 6 shows my invention applied to what may be called a "series-induced" motor. The stator is connected across the line-wires 1 2 and produces a magnetization of the line of the stator-terminals. An electromotive force is consequently induced in the rotor-winding along this line, which may be led off by means of commutator-brushes. The single commutator-brush $b$ is placed on this line and connected to the stator-winding at a point displaced ninety electrical degrees from the brush. The center of the compensators C is connected to a second point diametrically opposite the first. The current induced in the rotor is thus utilized to produce a magnetization of the motor on a line displaced ninety electrical degrees from that of the magnetization of the rotor-currents, and torque is consequently produced.

Fig. 7 shows my invention applied to a compensated repulsion-motor. In addition to the usual brush $b$ a second brush or set of brushes $b'$ is placed on the commutator and is connected to one terminal of a series transformer T of variable ratio, the primary of which is connected in series with the stator S. The other terminal of the secondary of transformer T is connected to the neutral point of the compensators C. The brush $b$ is also connected to this point, as in Fig. 4. The potential induced in the secondary of the transformer T is thus utilized to produce a field displaced ninety electrical degrees from that of the normal rotor-field. This arrangement would require four sets of brushes with the ordinary repulsion-motor.

In Fig. 8 I have shown my invention applied to a shunt-motor, and this figure requires no further description. I have thus shown my invention applied to a number of different types of alternating-current motors. It is, of course, also applicable to many types that I have not shown, since it may be used to advantage with all forms of alternating-current commutator-motors. In all the arrangements shown it will be seen that not only is the brush-friction reduced, but, what is still more important in alternating-current motors, the commutation losses are reduced, since only half the usual number of coils are being commutated at each instant.

It is obvious that the compensators may be stationary, if preferred, and connected to the rotor-winding through collector-rings instead of directly; but by mounting the compensators on the shaft, and thereby causing them to revolve with the rotor-winding, the use of collector rings and brushes is obviated. It is not essential that independent magnetic cores be employed for the compensators. The rotor itself may be utilized for this purpose. Thus in Fig. 9 the rotor R is provided with holes $d$, extending through the rotor-punchings, and the compensator C may be threaded through these holes, the rotor-core thus being utilized for the compensator-core.

Many other possible arrangements of the compensators will readily suggest themselves, and accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In an alternating-current motor, a rotor-winding provided with a commutator, and compensators each connected between displaced points on the rotor-winding and the points of connection of the several compensators being displaced from each other, the neutral points of said compensators serving as a terminal of said rotor-winding.

2. In an alternating-current motor, a rotor-winding provided with a commutator, a plurality of compensators each connected between points on the rotor-winding, the points of connection of the several compensators being symmetrically displaced on the rotor-winding, and the neutral points of the several compensators being connected and forming a terminal of the rotor-winding.

3. In an alternating-current motor, a rotor-winding provided with a commutator, compensators connected between points on the rotor-winding displaced by one hundred and eighty electrical degrees, the neutral point of said compensators serving as one terminal of the rotor-winding, and brushes bearing on the commutator and serving as the other terminal of the rotor-winding.

4. In an alternating-current motor, a rotor-winding provided with a commutator, and compensators revolving with said rotor-winding, each connected between displaced points on said rotor-winding and the neutral points of said compensators serving as a terminal of said rotor-winding.

5. In an alternating-current motor, a rotor-winding provided with a commutator, a plurality of compensators revolving with said rotor-winding, each compensator being connected to points on the rotor-winding displaced by one hundred and eighty electrical degrees and the neutral points of the several compensators being connected and forming one terminal of the rotor-winding, and brushes bearing on the commutator and forming the other terminal of the rotor-winding.

In witness whereof I have hereunto set my hand this 8th day of April, 1904.

ERNST J. BERG.

Witnesses:
BENJAMIN B. HULL,
HELEN ORFORD.